(12) United States Patent
Hsieh

(10) Patent No.: US 7,326,455 B2
(45) Date of Patent: Feb. 5, 2008

(54) PAD

(75) Inventor: Wen-Hsiang Hsieh, Chang-Hua (TW)

(73) Assignee: Good Success Corp., Chang-Hua Hsien (TW)

( * ) Notice: Subject to any disclaimer, the term of this patent is extended or adjusted under 35 U.S.C. 154(b) by 221 days.

(21) Appl. No.: 11/297,374

(22) Filed: Dec. 9, 2005

(65) Prior Publication Data

US 2007/0134461 A1 Jun. 14, 2007

(51) Int. Cl.
*B60N 2/60* (2006.01)
(52) U.S. Cl. ..................................... 428/52; 297/219.1
(58) Field of Classification Search .................. 428/44, 428/52; 297/219.1, 223, 224, 229, 452.45, 297/452.46

See application file for complete search history.

(56) References Cited

U.S. PATENT DOCUMENTS 1,243,709 A * 10/1917 Cavanaugh ................... 428/52

* cited by examiner

*Primary Examiner*—Alexander S. Thomas
(74) *Attorney, Agent, or Firm*—Banner & Witcoff, Ltd.

(57) ABSTRACT

A pad includes an array of rigid elements that are grouped into rows and columns of the rigid elements, a plurality of flexible sheets disposed to alternate with the columns of the rigid elements, and a plurality of strings, each of which extends through a respective one of the rows of the rigid elements and the flexible sheets.

5 Claims, 3 Drawing Sheets

PAD

BACKGROUND OF THE INVENTION

1. Field of the Invention

This invention relates to a pad, more particularly to a pad including flexible sheets disposed to alternate with columns of rigid elements so as to alleviate users' sudden hot or cold feeling upon contact with the pad.

2. Description of the Related Art

Most conventional seat pads are air-permeable. For example, a conventional seat pad includes: a plurality of rigid elements that are in the form of balls or beads and that are made from natural crystals, artificial crystals, woods, or bamboos; and a string unit extending through the rigid elements so as to tie the rigid elements together. Although there is a gap present between every adjacent pair of the rigid elements to ensure air permeability, the user will intimately contact the rigid elements when the user sits on the seat pad. Therefore, when the seat pad is used during winter, the user will experience a sudden cold feeling. On the other hand, if the seat pad is used during summer, the user experiences discomfort when sitting thereon.

Therefore, there is a need in the art to provide a seat pad that makes the user feel more comfortable.

SUMMARY OF THE INVENTION

The object of the present invention is to provide a pad including an array of rigid elements that are grouped into rows and columns of the rigid elements, a plurality of flexible sheets disposed to alternate with the columns of the rigid elements, and a plurality of strings. Each of the strings extends through a respective one of the rows of the rigid elements and the flexible sheets.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
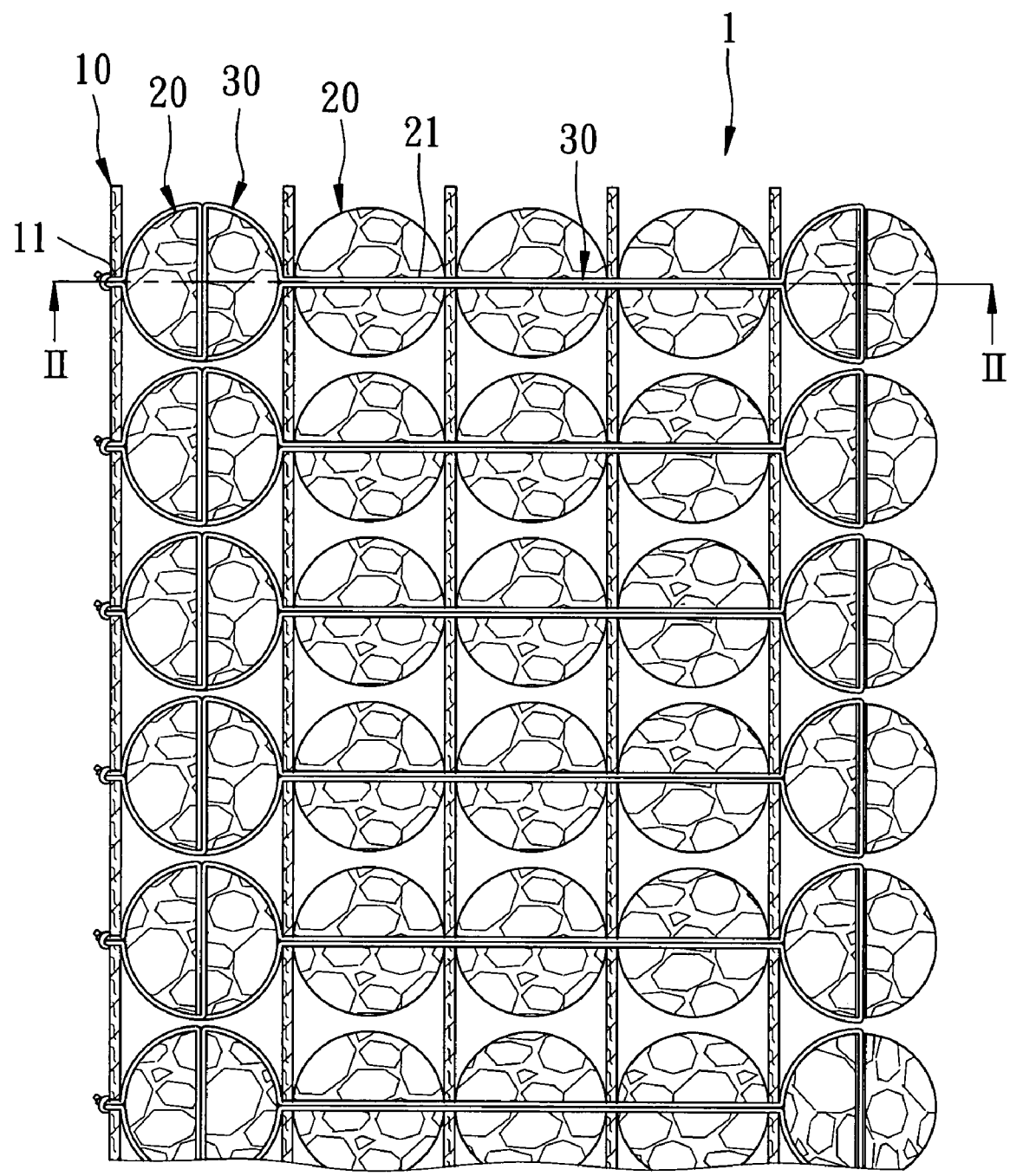
FIG. 1 is a fragmentary schematic view to illustrate the preferred embodiment of a pad according to this invention.

Referring to FIG. 1, the preferred embodiment of a pad 1 according to this invention includes an array of rigid elements 20 that are grouped into rows and columns of the rigid elements 20, a plurality of flexible sheets 10 disposed to alternate with the columns of the rigid elements 20, and a plurality of strings 30. Each of the strings 30 extends through a respective one of the rows of the rigid elements 20 and the flexible sheets 10.

By way of example, each of the rigid elements 20 is formed with a through-hole 21. Each of the flexible sheets 10 is formed with a plurality of through-holes 11, each of which corresponds to the through-holes 21 in a respective row of the rigid elements 20. Each of the strings 30 extends through the through-holes 21 in the respective row of the rigid elements 20 and the respective through-holes 11 of the flexible sheets 10. All the strings 30 are subsequently knotted on an outermost one of the flexible sheets 10 so as to fasten the rigid elements 20 and the flexible sheets 10 together.

As for the material suitable for preparing the flexible sheet 10, for example, each of the flexible sheets 10 may be made from a material selected from the group consisting of natural leathers, synthetic leathers, and woven fabrics.

As for the material suitable for preparing the rigid elements 20, for example, each of the rigid elements 20 may be made from a material selected from the group consisting of natural crystals, artificial crystals, woods, bamboos, magnet, tourmaline, ceramics, and metals.

Figure 2:
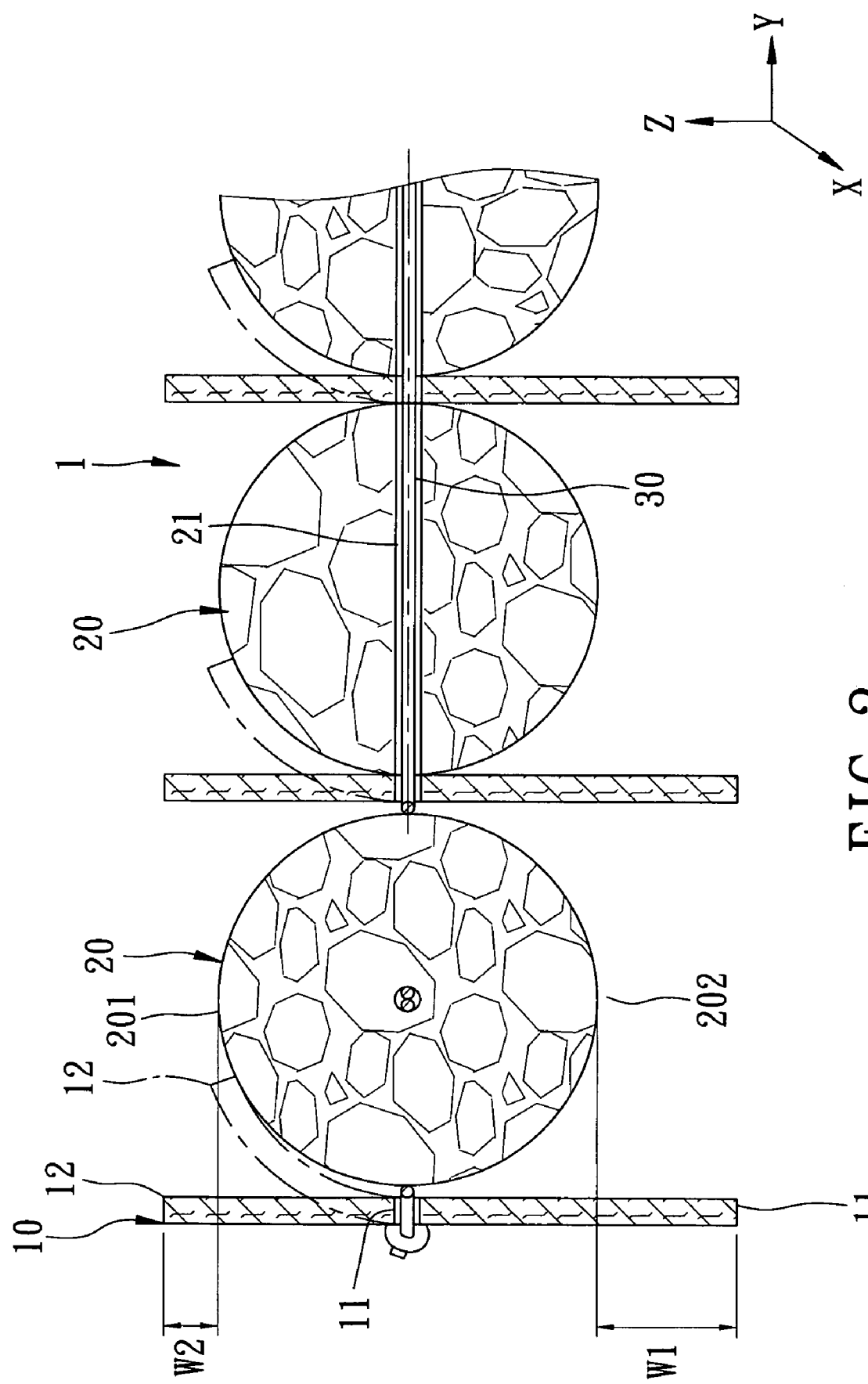
FIG. 2 is a fragmentary sectional view taken along line II-II in FIG. 1 to illustrate a state of use where first ends of rigid elements and flexible sheets of the preferred embodiment serve to contact the user when the user is seated thereon.
Figure 3:
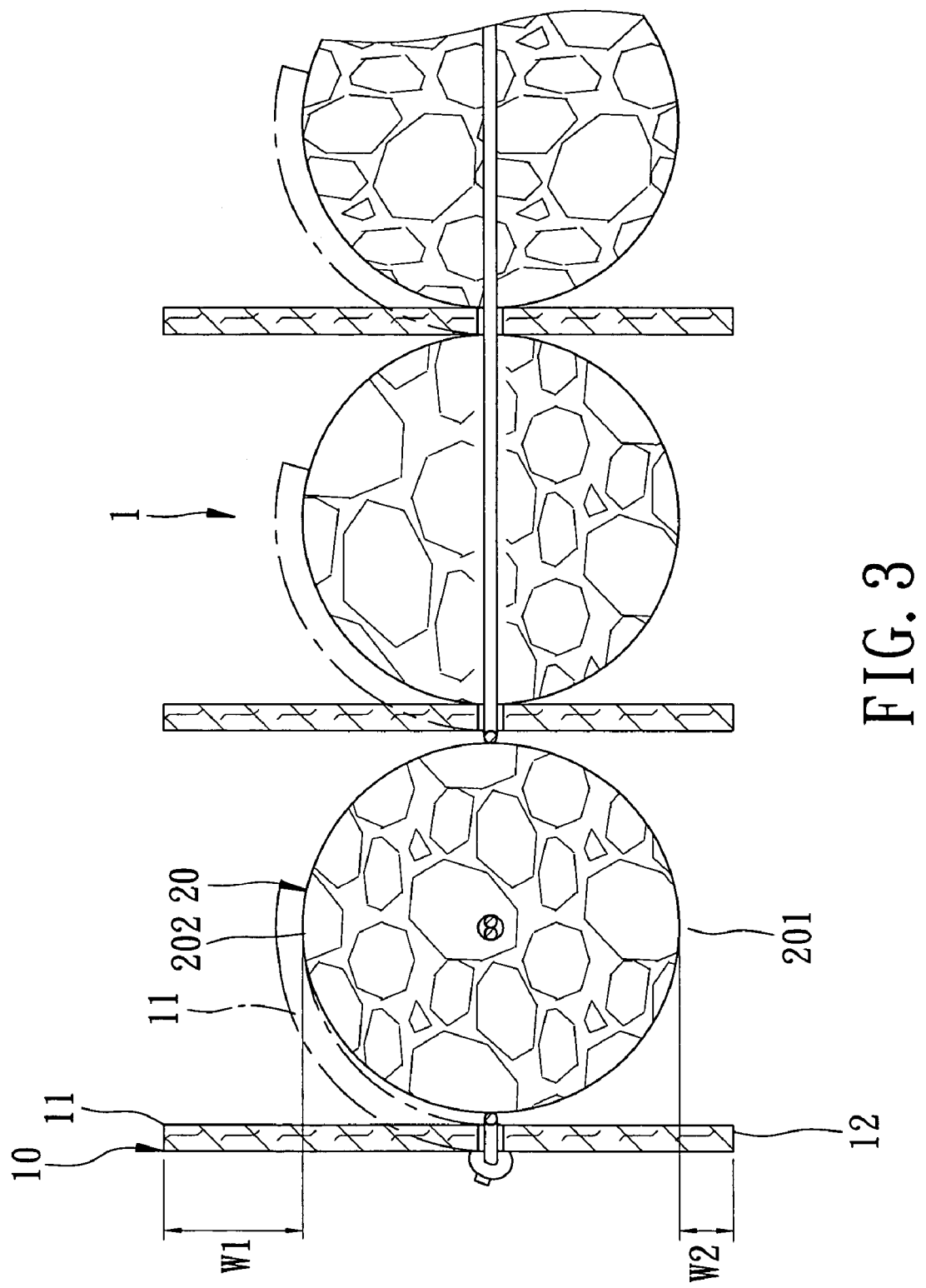
FIG. 3 is an inverted view of FIG. 2 to illustrate another state of use where second ends of rigid elements and flexible sheets of the preferred embodiment serve to contact the user when the user is seated thereon.

Referring to FIGS. 2 and 3, the rigid elements 20 are disposed in a horizontal plane (X-Y), and each of the flexible sheets 10 is disposed transverse to the horizontal plane (X-Y), and has first and second ends (12, 11) that are opposite to each other in a transverse direction (Z) relative to the horizontal plane (X-Y). Each of the rigid elements 20 has first and second ends (201, 202) that are opposite to each other in the transverse direction (Z). The first and second ends (12, 11) of each of the flexible sheets (10) extend respectively beyond the first and second ends (201, 202) of adjacent ones of the rigid elements 20.

Preferably, a projecting distance (W2) of the first end 12 of each of the flexible sheets 10 relative to the first ends 201 of the adjacent ones of the rigid elements 20 on a vertical plane (X-Z) that is transverse to the horizontal plane (X-Y) is different from a projecting distance (W1) of the second end 11 of each of the flexible sheets 10 relative to the second ends 202 of the adjacent ones of the rigid elements 20 on the vertical plane (X-Z). More preferably, as shown in FIGS. 2 and 3, the distance (W2) is shorter than the distance (W1).

In addition, in hot weather, the pad 1 can be used in a manner that the first ends 201 of the rigid elements 20 and the first ends 12 of the flexible sheets 10 face toward the user, as shown in FIG. 2. As such, the distance between the rigid elements 20 and a chair (not shown) is increased, thereby enhancing the heat dissipating effect of the pad 1. When the user sits on the pad 1, the first ends 12 of the flexible sheets 10 are pressed by the user, and partially cover the first ends 201 of the rigid elements 20, thereby partially insulating the user from the rigid elements 20 which are hot after being exposed to sunlight for some time.

Alternatively, in cold weather, the pad 1 can be used in a manner that the second ends 202 of the rigid elements 20 and the second ends 11 of the flexible sheets 10 face toward the user, as shown in FIG. 3. When the user sits on the pad 1, the second ends 11 of the flexible sheets 10 are pressed by the user, and partially cover the second ends 202 of the rigid elements 20, thereby insulating the user from the rigid elements 20 which are cold, and thereby alleviating the cold feeling attributed to contact with the rigid elements 20. Compared to the use state shown in FIG. 2, the area of the second end 202 of each of the rigid elements 20 that is covered by the second end 11 of the adjacent flexible sheet 10 is larger than that of the first end 201 of each of the rigid elements 20 that is covered by the first end 12 of the adjacent flexible sheet 10.

According to this invention, the pad 1 of this invention is suitable for use in hot or cold weather, and has a relatively simple structure. Hence, the pad 1 of this invention is economical and useful.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A pad comprising:
   an array of rigid elements that are grouped into rows and columns of said rigid elements;
   a plurality of flexible sheets disposed to alternate with said columns of said rigid elements; and
   a plurality of strings, each of which extends through a respective one of said rows of said rigid elements and said flexible sheets.

2. The pad of claim 1, wherein said rigid elements are disposed in a horizontal plane, each of said flexible sheets being disposed transverse to the horizontal plane, and having first and second ends that are opposite to each other in a transverse direction relative to the horizontal plane, each of said rigid elements having first and second ends that are opposite to each other in the transverse direction, said first and second ends of each of said flexible sheets extending respectively beyond said first and second ends of adjacent ones of said rigid elements.

3. The pad of claim 2, wherein a projecting distance of said first end of each of said flexible sheets relative to said first ends of said adjacent ones of said rigid elements on a vertical plane that is transverse to the horizontal plane is different from a projecting distance of said second end of each of said flexible sheets relative to said second ends of said adjacent ones of said rigid elements on the vertical plane.

4. The pad of claim 1, wherein each of said flexible sheets is made from a material selected from the group consisting of natural leathers, synthetic leathers, and woven fabrics.

5. The pad of claim 1, wherein each of said rigid elements is made from a material selected from the group consisting of natural crystals, artificial crystals, woods, bamboos, magnet, tourmaline, ceramics, and metals.

* * * * *